United States Patent [19]

Hollander et al.

[11] Patent Number: 4,735,661
[45] Date of Patent: Apr. 5, 1988

[54] RAPID RESPONSE, REMOVABLY AFFIXABLE THERMOCOUPLE

[75] Inventors: Milton B. Hollander; William E. McKinley, both of Stamford, Conn.

[73] Assignee: Omega Engineering, Inc., Stamford, Conn.

[21] Appl. No.: 928,982

[22] Filed: Nov. 10, 1986

[51] Int. Cl.⁴ .................. H01L 35/02; H01L 35/00
[52] U.S. Cl. .................... 136/233; 136/232; 156/329
[58] Field of Search .............. 136/225, 221, 230, 232, 136/233; 24/DIG. 11, 304, 67 AR; 29/DIG. 1, 573; 248/205.3, 205.4; 403/265; 156/51, 53, 55, 56, 182, 235, 239, 241; 40/594

[56] References Cited

U.S. PATENT DOCUMENTS

| | | | |
|---|---|---|---|
| 3,312,775 | 4/1967 | Lambert | 156/53 X |
| 3,350,045 | 10/1967 | Mayers | 248/205.3 |
| 3,360,404 | 12/1967 | Beckman | 136/230 |
| 3,377,208 | 4/1968 | Webb | 136/230 |
| 3,470,590 | 10/1969 | Hoff | 24/DIG. 11 |
| 3,556,865 | 1/1971 | Levy | 136/233 |
| 3,729,343 | 4/1973 | Thomas | 136/225 |
| 3,925,104 | 12/1975 | Thomas | 136/225 |
| 4,460,804 | 7/1984 | Svejkovsky | 156/51 X |

Primary Examiner—Deborah L. Kyle
Assistant Examiner—Brian S. Steinberger
Attorney, Agent, or Firm—Thaddius J. Carvis

[57] ABSTRACT

The object of this invention is to provide a rapid response thermocouple which is removably affixable to the surface whose temperature is to be measured, and a method of making such a thermocouple. The thermocouple of this invention comprises a thermocouple assembly 24, a first film 10 having an adhesive coating on one side, a second film 50 having an adhesive coating on both sides, a third film 30 and a tab 40, wherein the adhesive coated side of the first film is adhered to one of the adhesive-coated sides of the second film with the thermocouple assembly interposed between them, and further wherein the third film is removably adhered to the remaining adhesive-coated side of the second film with the tab disposed between them so that it partially extends beyond the edges of the second and third films to facilitate removal of the third film from the second film.

34 Claims, 1 Drawing Sheet

RAPID RESPONSE, REMOVABLY AFFIXABLE THERMOCOUPLE

DESCRIPTION

1. Technical Field

This invention relates to a rapid response, removably affixable thermocouple and a method of making it. More particularly, this invention relates to a rapid response thermocouple which may be removably affixed to the surface whose temperature is to be measured.

A thermocouple is the practical manifestation of the physical observation that when two wires composed of dissimilar metals are joined at both ends and one of the ends is heated, a continuous current flows in the resulting circuit. If this circuit is broken, the net open circuit voltage is a function of the junction temperature and the composition of the two metals. Using this principle, a thermocouple can be used to measure the temperature of a surface or composition when the junction of the thermocouple is placed in contact with the surface or composition and the nature of the metals used to form the thermocouple is known.

Unfortunately, the act of affixing a rapid response thermocouple to a surface whose temperature is to be measured creates several difficulties.

2. Background Art

In using a conventional thermocouple to measure a solid surface, the thermocouple is typically affixed to the surface in order to accurately measure temperature changes, to allow for "no hands" use and to ensure that the temperature of the surface is measured at the same location on the surface for accuracy when multiple measurements are desired. It is known in the prior art to permanently affix thermocouples to a solid surface, usually by use of an epoxy or other cement. It is also known to provide these thermocouples with a layer of a polymer laminate on one or both sides thereof in order to protect the thermocouple from interfering effects of the environment, electrically insulate the thermocouple, and provide a flat surface for cementing. A significant disadvantage of such prior art thermocouples is inaccuracy due to a number of factors: (1) if the cement is too thick, the heat from the surface is not rapidly transferred to the thermocouple; (2) if the cement is too thin and there is no laminate disposed between the surface and the thermocouple, the thermocouple may be grounded on the surface, which adversely affects accuracy; (3) the use of both a laminate and epoxy or like cement layer exaggerates response time deficiencies; (4) a technician will have difficulty applying precisely the same amount of cement for each thermocouple, thereby reducing consistency and reproducibility; and (5) any two technicians will have differing techniques for applying the cement, thereby applying different amounts and thereby also adversely affecting consistency and reproducibility. Moreover, when the thermocouple is cemented to a surface, it cannot be removed without damaging either it or the surface.

U.S. Pat. No. 3,925,104 to Thomas attempted to solve some of the problems with prior art thermocouples by providing a thermocouple tape comprising two overlapping strips of dissimilar metals disposed on an electrically nonconductive tape which is backed by an adhesive layer. Although economical due to its disposability, the apparatus of this patent is clearly not reusable and does not address the problem of cooling of the thermocouple function by conduction of heat by the leads.

What is desired, therefore, is a thermocouple wherein the thermocouple is electrically insulated from the surface it is attached to, the adhesive used to attach the thermocouple to the surface is consistent and sufficiently thin to allow for rapid response and accurate, reproducible thermocouple temperature readings, and the thermocouple is removably affixed to the surface.

DISCLOSURE OF INVENTION

In accordance with the present invention, a thermocouple is provided, comprising a thermocouple assembly disposed between a first film and a second film, the first film having a coating of an adhesive on one side and the second film having a coating of an adhesive on both sides, wherein a first adhesive coated side of the second film is adhered to the adhesive-coated side of the first film with the thermocouple assembly interposed between them. The thermocouple further comprises a third film removably adhered to the second adhesive-coated side of the second film, and, preferably, a tab disposed between the second and third films, partially extending beyond the second and third films.

The thermocouple of the present invention may be made by adhering the first film to the second film with the thermocouple assembly interposed between them. The third film may then be adhered to the second film with the tab disposed between them such that the tab partially extends beyond the edges of the second and third films.

BRIEF DESCRIPTION OF THE DRAWINGS

The present invention will be better understood and its advantages more apparent in view of the following detailed description, especially when read with reference to the appended drawings, wherein.

BEST MODE FOR CARRYING OUT THE INVENTION

Figure 1:
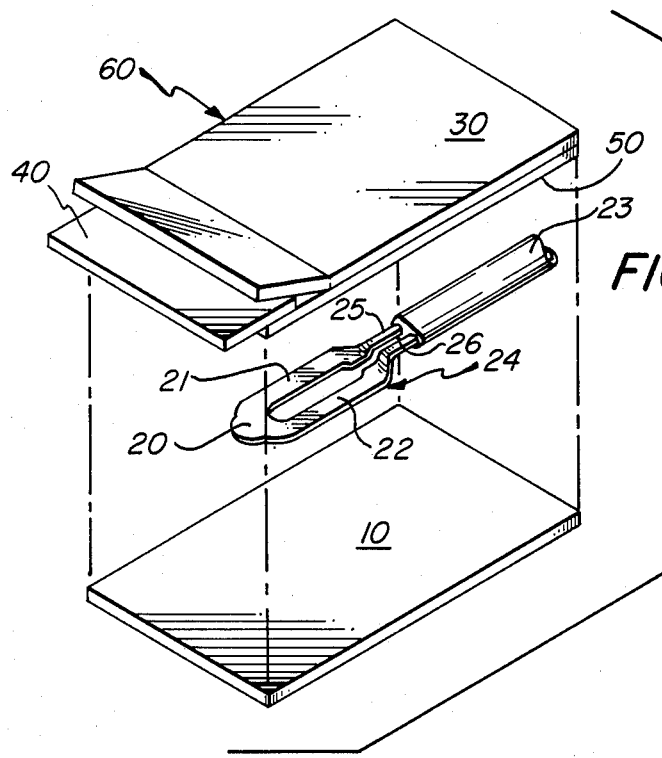
FIG. 1 is a partially exploded, perspective view of the thermocouple of the present invention.

The present invention is generally embodied in a thermocouple 60 for conducting temperature measurements on a surface. The thermocouple 60 may be used on many different surfaces, including curved or flat, metal, plastic or ceramic. The term "metal" as used herein refers to an opaque, fusible, ductile substance which is a good conductor of electricity and heat, including chemical elements as well as alloys thereof, such as iron, copper, nickel, chromium, aluminum and alloys thereof. The term "plastic" as used herein refers to any organic synthetic or processed material which is mostly thermoplastic or thermosetting polymer of high molecular weight and which can be molded, cast, extruded, drawn or laminated into objects, films or filaments, such as polyethylene, polypropylene and polyimide.

Referring particularly to FIGS. 1–4, thermocouple 60 is generally comprised of a thermocouple assembly 24; a first film 10 having a coating of an adhesive on one side; a second film 50 having a coating of an adhesive on both sides; a third film 30; and a tab 40. Thermocouple 60 is formed such that the adhesive-coated side of first film 10 is adhered to a first adhesive-coated side of second film 50 with assembly 24 interposed between them. Third film 30 is removably adhered to a second adhesive-coated side of second film 50 to cover the adhesive-coating on the second side of second film 50. Tab 40 is advantageously disposed between second film 50 and third film 30 so it partially extends beyond the edges of second film 50 and third film 30 to facilitate removal of third film 30 from second film 50. Removing third film 30 from second film 50 exposes the second adhesive-coated side of second film 50 for affixation to the surface whose temperature is to be measured by thermocouple 60, as explained in more detail below.

Figure 5:
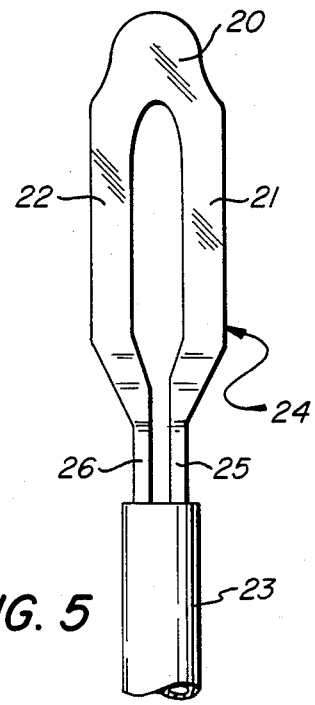
FIG. 5 is a top plan view of a thermocouple assembly suitable for use in the present invention.
Figures 6, 7:
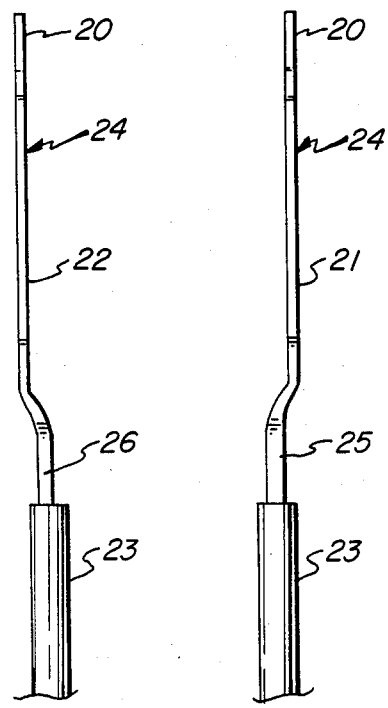
FIG. 6 is a side elevation view of a thermocouple assembly suitable for use in the present invention.
FIG. 7 is a side elevation view of a thermocouple assembly suitable for use in the present invention.

Referring to FIGS. 5–7, assembly 24 is comprised of a metal positive leg 21 and a metal negative leg 22, wherein the metals are dissimilar, as is conventional in the art. Although positive leg 21 is consistently depicted as being on one particular side of assembly 24 relative to negative leg 22, this is for convenience only. In practice, positive leg 21 and negative leg 22 can each be on either side relative to the other. Advantageously, positive leg 21 is comprised of copper, iron or a chromium-nickel alloy, commercially available as Chromel brand alloy from Hoskins Manufacturing Company of Hamburg, Mich. Negative leg 22 is advantageously comprised of an aluminum-nickel alloy, commercially available as Alumel brand alloy from Hoskins Manufacturing Company, or a copper-nickel alloy, commercially available as Constantan brand alloy from Hoskins Manufacturing Company. The thermocouples embodied in this invention are commonly referred to as types J, K, B, R, S, T, E, N or G, according to the standard Instrument Society of America designations.

The ends of positive and negative legs, 21 and 22, of assembly 24 are joined together to form junction 20, preferably by welding. Care must be taken that positive and negative legs 21 and 22 do not come into contact with each other except at junction 20. Positive and negative legs, 21 and 22, extend from thermocouple 60 by leads, 25 and 26, to a suitable device (not shown) for measuring, amplifying or recording the signals received therefrom, as desired, in order to detect the temperature at junction 20. Preferably, leads 25 and 26 extend from thermocouple 60 to the device and are protected by a suitable insulating material 23 for maintaining the integrity of the signal passing through leads 25 and 26 from junction 20 to the device. Materials suitable for insulating material 23 are conventional and well known to one skilled in the art.

Preferably, the portions of positive and negative legs, 21 and 22, including junction 20, which are not covered by insulating material 23 are sufficiently thin to allow for rapid heat transfer from the surface whose temperature is being measured to junction 20. Advantageously, these portions are no more than about 0.010 inches thick. More advantageously, they are no more than about 0.005 inches thick, with the most preferred thickness being about 0.003 inches. Although it is the temperature at junction 20 which is being measured, it is preferred that a portion of positive and negative legs, 21 and 22, which abut junction 20 also remain uncovered by insulating material 23, in order to assure that legs 21 and 22 abutting junction 20 are the same temperature as junction 20 to prevent the temperature of junction 20 from being affected by conductive heat loss to legs 21 and 22. A suitable amount of positive and negative legs 21 and 22 left uncovered, including junction 20, is about 0.25 to about 0.65 inches in length, with about 0.45 inches being most preferred, as illustrated in FIGS. 5–7. Additionally, exposed positive and negative legs 21 and 22 should preferably comprise sufficient surface area to ensure adequate thermal contact between thermocouple assembly 24 and the surface to prevent significant cooling of junction 20 by conduction of heat away from junction 20 by leads 25 and 26. Preferably, legs 21 and 22 are each about 0.03 to about 0.04 inches wide. Most preferably, each leg is about 0.035 inches wide. The space between legs 21 and 22 should advantageously be about 0.055 inches across as illustrated in FIG. 5 to ensure that positive and negative legs, 21 and 22, do not come into contact with each other, as discussed above.

Advantageously, assembly 24 is formed by joining the stripped ends of two insulated wires comprised of dissimilar metals which act as positive leg 21 and negative leg 22 of assembly 24. This may be accomplished by conventional means, such as by welding the ends of two 30 gauge (i.e., 0.010 inches in diameter) wires and then dressing the resulting bead, such as by grinding, to a smooth, flat surface without burrs or bumps. The desired thickness is achieved by pressing, rolling or swaging assembly 24.

First film 10 is advantageously a dimensionally stable, flexible film having good resistance to degradation due to temperature. Preferably, first film 10 is a polymer, more preferably a fiber-reinforced polymer. First flexible film 10 is most preferably a fiberglass-reinforced polymer laminate about 0.004 to about 0.005 inches thick. The dimensions of first film 10 depend on the size of the surface for which the temperature is to be measured, as is the case for thermocouple 60 as a whole. Typically, first film 10 is from about 0.6 to about 0.9 inches wide, preferably about 0.75 inches wide, and about 0.75 to about 1.25 inches long, preferably about 1 inch long.

First film 10 is coated on one side with an adhesive. Preferably, the adhesive is a pressure-sensitive inorganic adhesive, such as one comprising a silicone compound, especially a methyl phenyl silicone compound. Advantageously, the adhesive coating on first film 10 is from about 0.002 to about 0.003 inches thick, more preferably about 0.0025 inches thick, so as to provide adhesion of about forty ounces per inch width, as measured at room temperature (ca 70° F.) on a conventional apparatus such as a Scott brand adhesion tester, according to ASTM methods.

Second film 50 is preferably a dimensionally stable, flexible film having good thermal conductivity properties. Most preferably, second film 50 has a low thermal mass such that it does not degrade the surface temperature conduction characteristics between assembly 24 and the surface and effect the temperature being read. Second film 50 should also function to permit an ungrounded junction which allows assembly 24 to be electrically isolated from the surface being measured. This is desired so that extraneous voltages from the surface and between the surface and thermocouple 60 cannot affect the thermocouple 60 voltage. A third desirable characteristic of second film 50 is that it has good resistance to degradation due to temperature. Most preferably, second film 50 is a high temperature polymer, such as a polyimide film. Suitable polyamide films are commercially available as Kapton brand film from E. I. DuPont de Nemours Co. of Wilmington, Del. Preferably, second film 50 should have a thickness of about 0.0005 to about 0.0015 inches, more preferably about 0.001 inches. Advantageously, second film 50 has the same length and width dimensions as first film 10.

Second film 50 is coated on both sides with an adhesive. Suitable adhesives are those which exhibit resistance to temperature-induced degradation and also preferably exhibit good thermal conductivity characteristics. Advantageously, the adhesive is a pressure-sensitive inorganic adhesive such as an adhesive comprising a silicone compound, especially a methyl phenyl silicone compound. To exhibit the desired thermal conductivity characteristics, the adhesive coatings should preferably be about 0.0015 to about 0.0020 inches thick each, more preferably about 0.00175 inches thick each, so as to provide adhesion on each side of second film 50 of about twenty ounces per inch width, as measured by conventional means as described above.

Most preferably, the films and adhesives used in thermocouple 60 of this invention should be able to withstand a wide range of temperature without degrading. For instance, if thermocouple 60 is intended to be used in environments where the temperature can vary from about −75° F. to about 600° F., the component films and adhesives must retain their integrity and not degrade over that range. Suitable film materials and adhesives, such as those indicated above, must be chosen to have this characteristic.

Third film 30 should be a dimensionally stable flexible film which acts to temporarily cover the adhesive coating on a second side of second film 50. Third film 30 is, therefore, removably adhered to second film 50 and should be of such material to be adhered by the adhesive coated on second film 50, yet not permanently adhered. Suitable materials for third film 30 include paper and coated papers, such as wax-coated paper, rubber and plastic. Most preferred is a silicone-treated kraft paper. Third film 30 should preferably have the same dimensions as second film 50. Preferably, the edges of second film 50 and third film 30 from which tab 40 extends are co-extensive with each other so manipulation of tab 40 to facilitate removal of third film 30 from second film 50 is simplified.

The term "tab" as used herein refers to any component which can advantageously be disposed between second film 50 and third film 30 to facilitate removal of third film 30 from second film 50. Consequently, tab 40 can be any suitable non-adhering insert such as a block of material or a string. Tab 40 preferably comprises a rectangular block of a suitable material. The width of tab 40 is advantageously about equal to the distance along the edges of second film 50 and third film 30 from which tab 40 extends, and is of sufficient length and thickness to facilitate removal of third film 30 from second film 50. Preferably, tab 40 is from about 0.06 to about 0.2 inches long, more preferably about 0.125 inches long. Tab 40 may be comprised of any suitable material, such as a plastic, cardboard, paper, coated paper or rubber or other material having sufficient structural integrity and dimensional stability to withstand the forces exerted on it when being used to separate third film 30 from second film 50 or thermocouple 60 from the surface whose temperature is to be measured, as explained in more detail below. Most preferably, tab 40 is plastic.

Advantageously, in forming thermocouple 60 of this invention, assembly 24 is attached to the adhesive coated side of first film 10. A first adhesive-coated side of second film 50 is then joined to the adhesive-coated side of first film 10 with assembly 24 interposed between them. In practice, due to the relative thicknesses of assembly 24, the adhesive coated on second film 50, and second film 50 itself, thermocouple assembly 24 becomes embedded in the adhesive coating on the first adhesive coated side of second film 50, which brings assembly 24 into closer thermal contact with the surface whose temperature is to be measured. Tab 40 is then disposed on a second adhesive-coated side of second film 50 so tab 40 partially extends beyond an edge of second film 40. Third film 30 is then also disposed on the second adhesive-coated side of second film 50 to cover the adhesive, and also so that tab 40 partially extends beyond an edge of third film 30.

Figure 2:
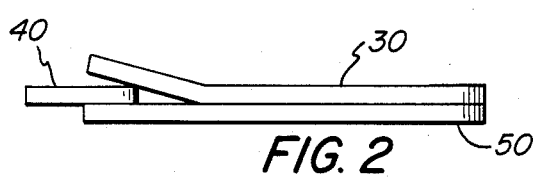
FIG. 2 is an enlarged side elevation view of the second film, third film and tab of the present invention.
Figure 3:
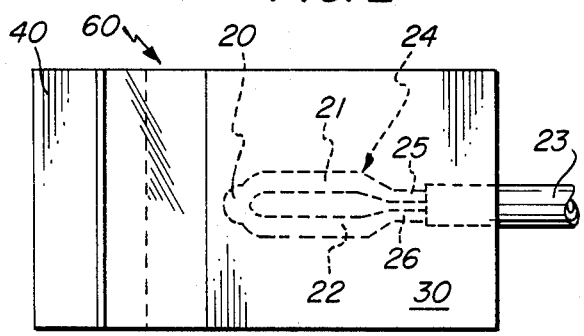
FIG. 3 is a top plan view of the present invention, showing the upper surface of the third film with the thermocouple assembly shown in dotted lines.
Figure 4:
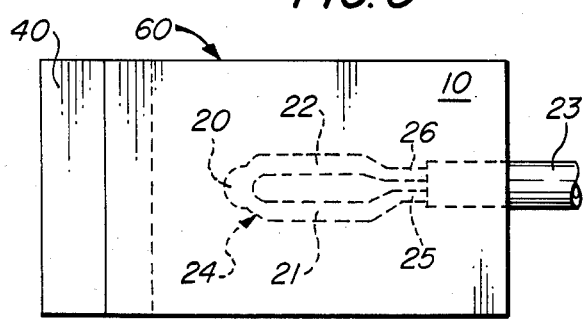
FIG. 4 is a top plan view of the present invention, showing the lower surface of the first film with the thermocouple assembly shown in dotted lines.

Alternatively, second film 50, tab 40 and third film 30 may be assembled together to form a separate element as illustrated in FIG. 2 and then joined to first film 10 with assembly 24 interposed between them as described above.

To use thermocouple 60 of this invention, third film 30 is peeled away from second film 50 to expose the adhesive-coated second side of second film 50. Peeling of third film 30 is facilitated by use of tab 40, which is used by bending thermocouple 60 with tab 40 which separates an edge of third film 30 from thermocouple 60. The separated edge of third film 30 may be gripped and pulled away from second film 50. Tab 40 may then be removed from thermocouple 60 and discarded, but, preferably, tab 40 is allowed to remain attached to second film 50. After removal of third film 30 from second film 50, thermocouple 60 may be affixed to the surface whose temperature is to be measured by the now-exposed adhesive on the second adhesive-coated side of second film 50. Thermocouple 60 may then be attached to any conventional device for measuring the voltage produced by the temperature of the surface on junction 20 as described above by connecting leads 25 and 26 extending from positive and negative legs 21 and 22 to the device.

If tab 40 is allowed to remain adhered to second film 50 after removal of third film 30, then upon affixation of thermocouple 60 of this invention to the surface whose temperature is to be measured, tab 40 is disposed between second film 50 and the surface. Because tab 40 does not have adhesive on it, thermocouple 60 can be removed from the surface without damage by lifting tab 40 and then peeling thermocouple 60 off the surface. Thermocouple 60 can then be reused. Preferably, third film 30 is saved after removal and replaced onto second film 50 to allow for storage of thermocouple 60 for reuse, or a replacement third film 30 can be applied.

While a preferred embodiment of the present invention has been described above and illustrated in the accompanying drawings, it is understood that other embodiments are with the contemplation of the inventors and their invention is not to be limited to those embodiments shown.

What is claimed is:

1. A thermocouple which may be removably affixed to a surface and reused after removal, the thermocouple comprising:
   (a) a thermocouple assembly comprising a positive leg, a negative leg and a junction, said assembly disposed between a first film and a second film, wherein said first film has a coating of an adhesive on one side, and said second film has a coating of an adhesive on both sides, wherein a first adhesive-coated side of said second film is adhered to the adhesive-coated side of said first film to interpose said assembly between said second film and said first film and further wherein said second film and adhesive coatings thereon exhibit thermal conductivity in environments ranging from about −75° F. to 600° F.; and
   (b) a third film removably adhered to said second film to cover a second adhesive-coated side of said second film.

2. The thermocouple of claim 1 wherein said third film is comprised of materials selected from the group consisting of paper, plastic, rubber and coated paper.

3. The thermocouple of claim 1 which further comprises a tab disposed between said second film and said third film, which tab partially extends beyond said second and third films to facilitate removal of said third film from said second film.

4. The thermocouple of claim 3 wherein said tab is comprised of materials selected from the group consisting of paper, plastic, rubber and coated paper.

5. The thermocouple of claim 1 wherein said assembly is not more than about 0.010 inches thick.

6. The thermocouple of claim 5 wherein said assembly is not more than about 0.005 inches thick.

7. The thermocouple of claim 1 wherein said thermocouple assembly is comprised of metals selected from the group consisting of iron, nickel, chromium, aluminum, copper and alloys thereof.

8. The thermocouple assembly of claim 7 wherein the adhesive coated on said first film comprises silicone.

9. The thermocouple of claim 1 wherein said first film comprises fiberglass.

10. The thermocouple of claim 9 wherein the adhesive coated on said first film is an inorganic adhesive.

11. The thermocouple of claim 1 wherein said assembly has sufficient surface area to ensure good thermal contact with the surface to measure the temperature at the surface without significant cooling of the junction by conductive cooling.

12. The thermocouple of claim 11 wherein each of the positive and negative legs of said assembly is about 0.03 to about 0.04 inches wide.

13. The thermocouple of claim 12 wherein each of said positive and negative legs of said assembly is about 0.035 inches wide.

14. The thermocouple of claim 1 wherein said second film is about 0.0005 to about 0.0015 inches thick.

15. The thermocouple of claim 14 wherein said second film is about 0.001 inches thick.

16. The thermocouple of claim 14 wherein said adhesive coated on each side of said second film is about 0.0015 to about 0.0020 inches thick.

17. The thermocouple of claim 16 wherein said adhesive coated on each side of said second film is about 0.00175 inches thick.

18. The thermocouple of claim 16 wherein said adhesive is applied to each side of said second film in a substantially uniform manner.

19. The thermocouple of claim 14 wherein said second film comprises a polyimide.

20. The thermocouple of claim 16 wherein the adhesive coated on each side of said second film is an inorganic adhesive.

21. The thermocouple of claim 20 wherein the adhesive coated on each side of said second film comprises silicone.

22. A thermocouple which may be removably mounted on a surface and reused after removal, the thermocouple comprising:
   (a) a thermocouple assembly comprising a positive leg, a negative leg and a junction, said assembly interposed between a first flexible film and a second flexible film, said assembly comprised of metals selected from the group consisting of iron, nickel, chromium, aluminum, copper and alloys thereof, wherein said assembly has a thickness of not more than about 0.005 inches and said positive and negative legs each have a width of about 0.003 to about 0.004 inches, and said first film comprises fiberglass having a coating of an adhesive comprising silicone on one side and said second film comprises a polyimide having a coating of an adhesive comprising silicone on both sides, wherein a first adhesive-coated side of said first film with said assembly permanently interposed between said first film and said second film and further wherein said second film and adhesive coatings thereon exhibit thermal conductivity in environments ranging from about −75° F. to 600° F.;
   (b) a third flexible film removably adhered to said second film to cover a second adhesive-coated side of said second film; and
   (c) a plastic tab disposed between said second film and said third film, wherein said tab partially extends beyond said second film and said third film to facilitate removal of said third film from said second film.

23. The thermocouple of claim 22 wherein said adhesive coated on each side of said second film has a thickness of about 0.00175 inches.

24. A method of making a thermocouple which may be removably affixed to a surface, the method comprising:
   (a) providing a thermocouple assembly comprising a positive leg, a negative leg and a junction by joining two dissimilar metals;
   (b) providing a first film having a coating of an adhesive on one side;
   (c) applying said thermocouple assembly to the adhesive-coated side of said first film to adhere said assembly thereto;
   (d) providing a second film having a coating of an adhesive on both sides;
   (e) applying a first adhesive-coated side of said second film to the adhesive-coated side of said first film to adhere said first film to said second film with said assembly interposed between said first film and said second film;
   (f) applying a third film to said second film to removably adhere said third film to said second film and cover the adhesive coating on a second side of said second film; and
   (g) disposing a tab between said second film and said third film whereby said tab partially extends beyond said second and third films to facilitate removal of said third film from said second film.

25. The method of claim 24 wherein the thickness of said adhesive coated on each side of said second film is about 0.00175 inches.

26. The method of claim 25 wherein said second film comprises a polyimide.

27. The method of claim 26 wherein the adhesive coated on said second film comprises silicone.

28. A method of making a thermocouple which may be removably affixed to a surface, the method comprising:
(a) providing a thermocouple assembly comprising a positive leg, a negative leg and a junction by joining two dissimilar metals;
(b) providing a first film having a coating of an adhesive on one side;
(c) applying said assembly to the adhesive-coated side of said first film to adhere said assembly thereto;
(d) assembling an element comprising a second film having an adhesive coating on both sides, a tab and a third film, whereby one of the adhesive coated sides of said second film is covered by said third film and said tab is disposed between said second and third films and partially extends beyond said second and third films to facilitate removal of said third film from said second film; and
(e) applying the exposed adhesive-coated side of said second film of said element to the adhesive-coated side of said first film to adhere said element to said first film with said assembly interposed between said first film and said second film.

29. The method of claim 28 wherein each of said positive and negative legs is about 0.035 inches wide.

30. The method of claim 28 wherein said assembly is swaged to a thickness of no more than about 0.005 inches.

31. The method of claim 28 wherein said third film comprises paper.

32. The method of claim 28 wherein said tab comprises plastic.

33. The method of claim 28 wherein said first film comprises fiberglass.

34. The method of claim 33 wherein said adhesive coated on said first film comprises silicone.

* * * * *